(12) United States Patent
Dezonno

(10) Patent No.: US 6,289,373 B1
(45) Date of Patent: *Sep. 11, 2001

(54) METHOD OF PROCESSING E-MAIL IN AN AUTOMATIC CALL DISTRIBUTOR

(75) Inventor: Anthony J. Dezonno, Chicago, IL (US)

(73) Assignee: Rockwell Electronic Commerce Corp., Wood Dale, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,619

(22) Filed: Aug. 24, 1998

(51) Int. Cl.$^7$ ................................................. G06F 15/16
(52) U.S. Cl. ..................... 709/206; 709/200; 709/204; 709/207; 709/219
(58) Field of Search .................... 709/204, 205, 709/206, 104, 219, 200, 207; 370/271; 379/201, 209, 216, 265

(56) References Cited

U.S. PATENT DOCUMENTS

| | | | |
|---|---|---|---|
| 4,289,934 | 9/1981 | Pitroda et al. | 379/269 |
| 4,627,047 | 12/1986 | Pitroda et al. | 370/384 |
| 5,001,710 | * 3/1991 | Gawrys et al. | 370/271 |
| 5,140,611 | 8/1992 | Jones et al. | 375/219 |
| 5,268,903 | 12/1993 | Jones et al. | 370/110.1 |
| 5,335,269 | 8/1994 | Steinlicht | 379/266 |
| 5,365,581 | 11/1994 | Baker et al. | 379/196 |
| 5,469,504 | 11/1995 | Blaha | 379/265 |
| 5,500,891 | 3/1996 | Harrington et al. | 379/265 |
| 5,765,033 | * 9/1998 | Miloslavsky | 709/206 |
| 5,884,032 | * 3/1999 | Bateman et al. | 709/204 |
| 5,946,629 | * 8/1999 | Sawyer et al. | 455/466 |
| 6,021,428 | * 1/2000 | Miloslavsky | 709/206 |

FOREIGN PATENT DOCUMENTS 05-327762 * 12/1993 (JP) ................................. 12/54

OTHER PUBLICATIONS

Dialogic Corp.—Production introduction [Hardware Product Introduction; Voice I/o Device, Mar. 11, 1996, v11, n11, p9(1)].*

* cited by examiner

Primary Examiner—Dung C. Dinh
Assistant Examiner—Chuong Ho
(74) Attorney, Agent, or Firm—Welsh & Katz, Ltd.

(57) ABSTRACT

A method and apparatus are provided for processing an E-mail message in an automatic call processor. The method includes the steps of determining a telephone number of a sender of the E-mail message, setting-up a call connection between the automatic call distributor and sender of the E-mail message based upon the determined telephone number and delivering the call connection to an agent of the call distributor.

25 Claims, 1 Drawing Sheet

METHOD OF PROCESSING E-MAIL IN AN AUTOMATIC CALL DISTRIBUTOR

FIELD OF THE INVENTION

The field of the invention relates to automatic call distributors and more particularly to agents of an automatic call distributor who also receive E-mail.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are consider equal, the automatic call distributor (ACD) may distribute the calls based upon which agent position (telephone) has been idle the longest.

In order to distribute incoming calls from the PSTN to the available agents, the interaction of a controlling computer with a switching fabric of the ACD becomes essential. Often a connection of the ACD to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer a call to a queue of the selected agent (or group of agents) or directly to the selected agent. At the same time that the call is delivered to the agent, the controller sends an identifier of the selected agent and ANI number of the customer to a controller of the database (the host). The host, in turn, displays the customer records on a computer monitor of the terminal of the selected agent at the same time the call is delivered.

While the existing method of ACD operation is relatively satisfactory, it is not readily adapted to inquires from customers arriving via the Internet. Accordingly, a need exists for a means of adapting ACD operation to a multi-media environment which includes voice, data, the Internet or some combination thereof.

SUMMARY

A method and apparatus are provided for processing an E-mail message in an automatic call processor. The method includes the steps of determining a telephone number of a sender of the E-mail message, setting-up a call connection between the automatic call distributor and sender of the E-mail message based upon the determined telephone number and delivering the call connection to an agent of the call distributor.

DETAILED DESCRIPTION OF A PREFERRED EMBODIMENT

Figure 1:
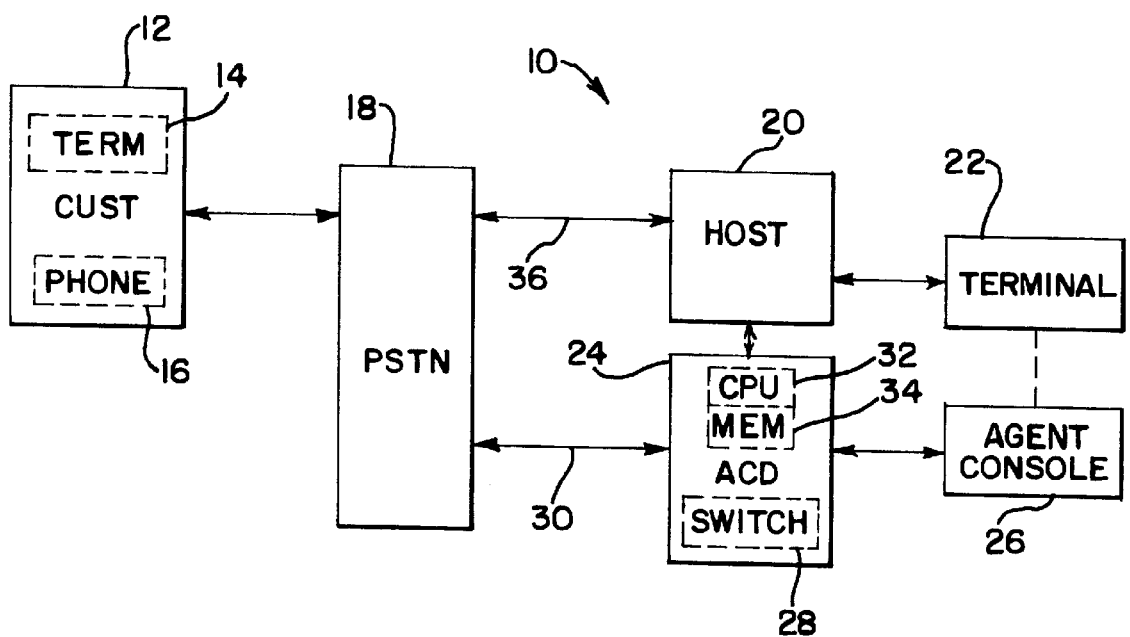
FIG. 1 depicts apparatus for processing E-mail in an automatic call distributor in accordance with an embodiment of the invention.

FIG. 1 is a block diagram of an automatic call distributor (ACD) system 10, generally, in accordance with an illustrated embodiment of the invention. Under the embodiment, the ACD 10 may process customer inquiries under either a voice or E-mail format. A call from a customer at a customer location 12 may be initiated from subscriber telephone 16 or a customer inquiry (call) may also be delivered by E-mail, through a customer terminal 14 connected to the Internet through an appropriate Internet gateway (e.g., AOL).

Calls from customers may be handled by agents associated with the ACD 10. An agent station may include an agent station 26 (e.g., a telephone) and associated agent terminal 22. Calls under a voice format may be delivered to an agent station 26 along with a screen pop on the agent terminal 22 of associated customer data. The customer data may be identified by the host based upon ANI information delivered to the host in a known manner. Calls delivered under an E-mail (e.g., data format) may be delivered as a visual message displayed on a screen of a terminal 22 of the agent assigned to the call.

To facilitate delivery of calls, an owner of the ACD 10 may disseminate by advertising or otherwise, an address for delivery of calls. In the case of calls under a voice format, the address may simply be a telephone number. In the case of E-mail, the address may simply be an E-mail address.

Under the embodiment, calls delivered from the PSTN 18 to the ACD 10 under voice format may be handled conventionally. The ACD 10 may include a switch 28 which may be interconnected with the PSTN 18 through a number of trunk lines 30. The PSTN 18 may offer service on the trunk lines 30 in association with services such as ANI or DNIS. Call control, call maintenance, and call set-up may be accomplished over the trunk line itself or over an associated control channel.

DNIS information supplied by the PSTN 18 is useful where inbound calls to the ACD 10 may be directed to any of a large block of telephone numbers assigned to the ACD 10. Calls of the block of numbers may be delivered to the ACD 10 through the trunk lines 30 in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

The switch 28 is controlled by a central processing unit, or CPU 32, in conjunction with peripheral memory device 34. Control of the switch 28 and communications with the host 20 and PSTN 18 may be accomplished generally as described in U.S. Pat. No. 5,268,903, and U.S. Pat. No. 5,140,611, both to Jones, and both incorporated herein by reference. Routing of calls to agents 26 and overflow of calls may e accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 32 monitors each port of the switch 28 for changes in status. A change in status may be an agent unit 26 going off-hook to make a call, an agent unit hanging up after a call, or it may be a call alerting tone detected on a trunk, alerting the CPU 32 to the presence of an incoming call.

Where the status change is an agent 26 hanging up, the CPU 32 acts to tear-down the call connection within the switch 28 between the agent at a first port of the switch and a second party to the conversation communicating through a second port of the switch 28. Upon tear down of the connection, the CPU 32 also sends a message to the host, notifying the host of termination of the call connection. The message to the host 20 includes at least the identity of the agent 26.

Where the status change is a call alert signal on an incoming trunk line (or control channel associated with the incoming trunk line), then the CPU 32 may send an acknowledge message to the PSTN 18 accepting the call. The PSTN 18 may respond with the forwarding of DNIS and ANI messages, identifying the called and calling party.

Upon accepting the call, the CPU 32 first stores the DNIS and ANI numbers in a termination table of the memory 34. More specifically, the CPU 32 maintains a table of call information for each port of the switch 24. Where a call is accepted on an incoming trunk line, the CPU 32 enters the DNIS and ANI number into the table for the incoming trunk line upon which the call is received.

In addition to updating the termination table within memory 34, the CPU 32 also generates a call identifier (also sometimes referred to as a call ID or sequence number) for the call, unique to the switch 28. The call identifier along with the ANI and DNIS numbers may then be sent to the host 20 as part of a call arrival message. The call arrival message includes a header identifying the message as being a call arrival message. The message may also include an ANI number, DNIS information and the call identifier.

Delivery of the ANI and DNIS numbers and call identifier allows the host 20 to create a unique call record for the call in memory 34, in a call record area of memory 34. The call record (and specifically the ANI information within the call record) may be used to retrieve customer records for delivery to an appropriate display terminal 22 once the call has been assigned to an agent 26.

The CPU 32 then, by reference to the DNIS number, determines the identity of an agent 26 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 26 (or group of agents) the CPU 32 instructs the switch 28 to internally connect the port of the incoming trunk to a port of one of the identified agents.

Where the call has been connected to an agent, the CPU 32 stores the port number of the identified agent in the termination table for the port of the incoming trunk. Likewise, the CPU 32 stores the port identifier of the incoming trunk in the termination table of the identified agent.

To complete set-up of the call to the identified agent, the CPU 32 sends a call completion message (e.g., an INFORM HOST-CALL STATUS message) to the host 20. The call completion message may include a header identifying the message as being a call completion message. The call completion message may also include at least a port identifier of the identified agent and the call identifier. The information of the call completion message is stored in the call record previously created in conjunction with call arrival. The port identifier and call identifier allows the host 20 to deliver customer data to the specific display terminal of the agent to which the call was delivered.

In the case where the incoming call is an E-mail message, a similar process may be used. Upon receipt of the E-mail message, the host 20 takes steps to open a file for the E-mail message and an associated call record. The host 20 also generates and stores a host identifier in the call record.

As is known, an E-mail message inherently contains an E-mail address of the sender. As part of the processing of a received E-mail message, the host 20 may retrieve the address of the sender and return an acknowledgement to the sender. The acknowledgement may be of the form "Thank you for your E-mail message—We will respond shortly."

Upon completion of the E-mail file and call record, the host 30 may retrieve a telephone number of a sender for a return call by an agent of the ACD 10. Where the operator of the ACD 10 is a commercial entity, that operator may maintain a website for customers through a separate connection 36 between the host 18 and PSTN 18. As part of the website, the operator may maintain a webpage with a window for entry of a telephone number for a return call by an agent of the ACD 10. The webpage may also provide a second window for entry of text related to specific subject areas.

Alternatively, E-mail messages may be sent to the host 20 under a free-form format, with a telephone number located within the text. In that case the host 20 may scan the E-mail message for number strings corresponding to telephone numbers. For example, the host 20 may scan the text of the E-mail message for 7 or 10 digit numbers. Any 7 or 10 digit number detected may be assumed to be a call request.

Upon detecting a telephone number for a return call, the host 20 may transfer the number to the CPU 32 along with instructions to place a call to the number. The host 20 may also place the E-mail call in a call queue of the ACD 24 for agent assignment.

In order to place the call in an appropriate call queue, the host 20 may analyze the E-mail transmission under a number of criteria. For example, the host 20 may compare any detected telephone number with lists of telephone number of known customers.

The E-mail address of the sender may also be compared with a lists of customers in an effort to identify the sender as a repeat or new customer. Where a caller is identified as a repeat customer, the host 20 may use such knowledge to assign the call to an appropriate agent and to identify a set of customer records which may be displayed to an assigned agent.

In addition, the host may also scan the E-mail message for key words or key words in context. For example, where an owner of the ACD system 10 sells a number of products with specific identifiable names, the host 20 may scan the text for those names and request an agent assignment consistent with any identified product names. Trademarks of products may also be used as an indicator of a product interest, as may generic names of products. Specific word combinations of sales promotions may be used as indicators of a specific interest.

Using the results of the analysis, the host 20 may compose an agent request for transfer to the CPU 32. The request may include any identified telephone number associated with the E-mail message as well as agent assignment criteria associated with the identity of the caller or subject matter of the call determined by any identified key words.

Upon receipt of the agent request, the CPU 32 may assign an agent immediately, or place the request in an agent queue. Where the request is placed in a queue, the CPU 32 may respond with an acknowledgment. When the request reaches the head of the queue, the CPU 32 may forward the identity of the selected agent to the host 20.

Where the request included a telephone number associated with the E-mail message, the CPU 32 may seize a trunk connection with the PSTN 18 and transfer the identified digits to the PSTN 18. The CPU 32 may monitor the connection for call progress information. When a connect tone is received from the PSTN 18, the CPU 32 may instruct the switch 28 to form a connection between the seized trunk and selected agent console 26.

Upon receiving an indication of the identity of the selected agent from the CPU 32, the host 20 may retrieve the E-mail message for presentation to the selected agent. Based upon the identity of the selected agent, the host 20 may refer to a lookup table for the identify of a terminal 22 of the selected agent. Based upon the identity of the terminal 22 of the selected agent, the host 20 may display the E-mail message on the terminal 22 for the benefit of the selected agent.

The result is that the agent console 26 may begin to ring at the same time as the E-mail message is presented to the agent on a display of the agent terminal 22. Visual presentation of the E-mail message to the agent at the same time as return call presentation to the agent through the agent console 26 allows the agent to rapidly assimilate the content of the message as well as to be able to rapidly and efficiently respond to the customers questions and concerns.

A specific embodiment of a method and apparatus of processing E-mail in an automatic call distributor according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of processing an E-mail message sent under a free-form format to an automatic call processor, such method comprising the steps of:

scanning the E-mail message sent under the free-form format to determine a telephone number of a sender of the E-mail message;

setting-up a call connection between the automatic call distributor and sender of the E-mail message based upon the determined telephone number; and concurrently delivering the call connection and E-mail message to an agent of the call distributor.

2. The method of processing the E-mail message as in claim 1 further comprising delivering a copy of the E-mail message to the agent along with the call connection.

3. The method of processing the E-mail message as in claim 2 wherein the step of delivering a copy of the E-mail message to the agent along with the call connection further comprises displaying the E-mail message on a display of the agent concurrent with delivery of the call.

4. The method of processing the E-mail message as in claim 1 wherein the step of determining a telephone number further comprises scanning a text content of the E-mail message for a number string corresponding to a telephone number.

5. The method of processing the E-mail message as in claim 1 further comprising sending an acknowledging E-mail message back to the sender.

6. The method of processing the E-mail message as in claim 5 wherein the step of sending an acknowledging E-mail message to the sender further comprises recovering an E-mail address of the sender from a header from the E-mail message.

7. The method of processing the E-mail message as in claim 1 further comprising determining an identity of the sender of the E-mail message.

8. The method of processing the E-mail message as in claim 1 wherein the step of determining an identity of the sender further comprises selecting an agent from a group of agents based upon the identity of the sender.

9. The method of processing the E-mail message as in claim 1 further comprising determining a subject matter of the E-mail message based upon key words in context found within the E-mail message.

10. The method of processing the E-mail message as in claim 9 wherein the step of determining a subject matter of the E-mail message further comprises selecting an agent from a group of agents based upon the subject matter of the E-mail message.

11. Apparatus for processing an E-mail message sent under a free-form format to an automatic call processor, such apparatus:

means for scanning the E-mail message sent under the free-form format to determine a telephone number of a sender of the E-mail message;

means for setting-up a call connection between the automatic call distributor and sender of the E-mail message based upon the determined telephone number; and means for concurrently delivering the call connection and E-mail message to an agent of the call distributor.

12. The apparatus for processing the E-mail message as in claim 11 further comprising means for delivering a copy of the E-mail message to the agent along with the call connection.

13. The apparatus for processing the E-mail message as in claim 12 wherein the means for delivering a copy of the E-mail message to the agent along with the call connection further comprises means for displaying the E-mail message on a display of the agent concurrent with delivery of the call.

14. The apparatus for processing the E-mail message as in claim 11 wherein the means for determining a telephone number further comprises means for scanning a text content of the E-mail message for a number string corresponding to a telephone number.

15. The apparatus for processing the E-mail message as in claim 11 further comprising means for sending an acknowledging E-mail message back to the sender.

16. The apparatus for processing the E-mail message as in claim 15 wherein the means for sending an acknowledging E-mail message to the sender further comprises means for recovering an E-mail address of the sender from a header from the E-mail message.

17. The apparatus for processing the E-mail message as in claim 11 further comprising means for determining an identity of the sender of the E-mail message.

18. The apparatus for processing the E-mail message as in claim 11 wherein the means for determining an identity of the sender further comprises means for selecting an agent from a group of agents based upon the identity of the sender.

19. The apparatus for processing the E-mail message as in claim 11 further comprising means for determining a subject matter of the E-mail message based upon key words in context found within the E-mail message.

20. The apparatus for processing the E-mail message as in claim 19 wherein the means for determining a subject matter of the E-mail message further comprises means for selecting an agent from a group of agents based upon the subject matter of the E-mail message.

21. Apparatus for processing an E-mail message sent under a free-form format to an automatic call processor, such apparatus:
- a message processor adapted to scan the E-mail message sent under a free-form format to determine a telephone number of a sender of the E-mail message;
- a call connection processor adapted to set-up a call connection between the automatic call distributor and sender of the E-mail message based upon the determined telephone number; and
- a switch of the automatic call distributor adapted to deliver the call connection to an agent of the call distributor, said message processor being further adapted to deliver the E-mail message to the agent concurrently with delivery of the call connection.

22. The apparatus for processing the E-mail message as in claim 21 further comprising a host adapted to receive the E-mail message and to deliver a copy of the E-mail message to the agent along with the call connection.

23. The apparatus for processing the E-mail message as in claim 21 further comprising an E-mail acceptance processor adapted to send an acknowledging E-mail message back to the sender.

24. The apparatus for processing the E-mail message as in claim 21 further comprising a message analyzing processor adapted to determine an identity of the sender of the E-mail message.

25. The apparatus for processing the E-mail message as in claim 21 further comprising a key word processor adapted to determine a subject matter of the E-mail message based upon key words in context found within the E-mail message.

* * * * *